United States Patent
Toepfer et al.

(10) Patent No.: US 6,460,943 B1
(45) Date of Patent: Oct. 8, 2002

(54) BRAKE PRESSURE CONTROL METHOD FOR A MOTOR VEHICLE POWER BRAKE SYSTEM

(75) Inventors: Bernhard Toepfer, Stuttgart (DE); Wolfgang Mueller, Ebersbach (DE); Michael Reiner, Fellbach (DE); Reinhard Helldoerfer, Igelsdorf (DE)

(73) Assignees: DaimlerChrysler AG, Stuttgart (DE); Temic Telefunken Microelectronic GmbH, Heilbronn (DE)

( * ) Notice: Subject to any disclaimer, the term of this patent is extended or adjusted under 35 U.S.C. 154(b) by 0 days.

(21) Appl. No.: 08/313,983

(22) Filed: Sep. 27, 1994

(30) Foreign Application Priority Data

Sep. 27, 1993 (DE) .......................... 43 32 838

(51) Int. Cl.$^7$ .............................. B60T 8/60
(52) U.S. Cl. ...................... 303/155; 303/113.4
(58) Field of Search ................ 303/3, 15, 20, 303/155, 160, 166, 167, 177, 181, 113.4

(56) References Cited

U.S. PATENT DOCUMENTS

| | | | |
|---|---|---|---|
| 4,327,414 A | * 4/1982 | Klein | 303/155 X |
| 4,606,586 A | 8/1986 | Eckert et al. | |
| 4,610,484 A | 9/1986 | Amberg et al. | |
| 4,712,839 A | 12/1987 | Brearley et al. | |
| 4,743,072 A | * 5/1988 | Brearley | 303/115 X |
| 4,787,683 A | 11/1988 | Singleton | |
| 4,850,650 A | 7/1989 | Eckert et al. | |
| 4,872,731 A | * 10/1989 | Nakamura | 303/155 X |
| 5,236,252 A | * 8/1993 | Phipps | 303/160 X |
| 5,332,298 A | * 7/1994 | Fujioka | 303/113.4 X |
| 5,378,052 A | * 1/1995 | Yoshino | 303/155 X |

FOREIGN PATENT DOCUMENTS

| | | |
|---|---|---|
| DE | 24 30 448 | 1/1976 |
| DE | 38 29 951 C2 | 3/1990 |
| DE | 40 07 360 A1 | 9/1991 |
| DE | 41 36 571 C1 | 3/1993 |
| EP | 0 136 689 A2 | 4/1985 |
| EP | 0204483 A2 | 12/1986 |
| EP | 0 204 483 A2 | 12/1986 |
| WO | WO 83/03230 | 9/1983 |

* cited by examiner

*Primary Examiner*—Jack Lavinder
*Assistant Examiner*—Bradley King
(74) *Attorney, Agent, or Firm*—Crowell & Moring LLP

(57) ABSTRACT

A method controls brake pressure for a motor vehicle pressure medium-actuated power brake system in which the adjustment of a proportionality factor (k) between deceleration and brake pressure starting from an initial value ($k_o$) is limited to a range bounded by a lower limit value and an upper limit value in which range the initial value ($k_o$) is contained. This produces a warning travel of the pedal when excessive deviation of the brake pressure from the expected value occurs. The warning travel informs the driver of the braking effect which is deviating excessively from the expected degree. Methods are known in which a specific travel ($s_p$) of the brake pedal is interpreted as a setting of a specific desired deceleration ($z_s$) of the vehicle and the required brake pressure is set automatically if appropriate by incrementally adjusting a variable proportionality factor (k).

16 Claims, 2 Drawing Sheets

BRAKE PRESSURE CONTROL METHOD FOR A MOTOR VEHICLE POWER BRAKE SYSTEM

CROSS-REFERENCE TO RELATED APPLICATIONS

This application is related to application Ser. No. 08/286,231 filed on Aug. 5, 1994 in the names of Bernhard TOEPFER, Michael REINER and Bodo KLEIN for METHOD OF DETERMINING A WEAR-DEPENDENT BRAKING FORCE DISTRIBUTION, the subject matter of which is incorporated herein by reference.

BACKGROUND AND SUMMARY OF THE INVENTION

The present invention relates to a method for electronically influenced brake pressure control for a motor vehicle pressure medium-actuated power brake system, activated by a brake pedal, and, more particularly, to a brake pressure control method assigning a specific desired vehicle deceleration within a braking process to each travel of the brake pedal, and selectively setting the required brake pressure automatically by incremental adjustment of a variable proportionality factor between deceleration and brake pressure from an initial value.

A known method as described in DE 38 29 951 C2 carries out a load-dependent brake pressure control on a utility vehicle equipped with an antilock brake system. In contrast to systems with automatically load-dependent brake control in which a specific brake pedal travel is interpreted by the control as a setting of a specific brake pressure level, a specific brake pedal travel in the known method is interpreted as a setting of a desired deceleration of the vehicle. The use of an electronically controlled brake system permits the brake pressure level to be changed, even when the same brake pedal position is maintained, and, the desired deceleration to be set, specifically independently of the load state, including a possible trailer vehicle, and independently of the presence of a positive or negative gradient. This change in brake pressure with a fixed pedal position is effected by adjusting the proportionality factor between the desired deceleration and the average brake pressure. With this known measure, a satisfactory division into increments of the brake deceleration at the pedal is achieved for all load states, even taking into account the mass of a possible trailer. A uniform brake pedal sensation is achieved with a brake system in proper working order even in sections of the roadway with a positive or negative gradient. Since a genuine deceleration of the vehicle is assigned to each actuation of the pedal, the driver is also prompted, when going downhill, to use the wear-free and the fading-free permanent brake system provided for this purpose, utilizing engine brake and retarder, because only in this way is an equilibrium state with constant travel speed possible, with the possibility of intermittent braking, e.g. on a slippery or wet roadway, being retained.

Further methods in which the brake pedal travel is interpreted as a specification of a desired vehicle deceleration and the brake pressure is set correspondingly are disclosed, for example, in DE 24 30 448 A1, WO 83-03230, U.S. Pat. No. 4,712,839 and U.S. Pat. No. 4,850,650.

An object of the present invention is to provide a method with which a warning effect, in the case of an excessively low braking effect, is issued to the driver despite the automatic setting of the brake pressure.

This object has been achieved in accordance with the present invention by a method in which the adjustment of the proportionality factor is limited to a range bounded by a lower limit value and an upper limit value, and contains the initial value.

Adjustment of the proportionality factor between deceleration and brake pressure is thus limited to a predeterminable range. This leads to the proportionality factor only being adjusted at maximum up to the upper range limit value during the attempt within a braking process to achieve the desired deceleration of the vehicle, so that the brake pressure which can be achieved within this adjustment process is only increased to a specific degree above the expected value. In situations in which the brake pressure which is increased to this extent is not sufficient to achieve the desired deceleration, the brake pressure consequently remains at the value associated with the upper limit value of the proportionality factor and the actual deceleration achieved is consequently below the desired deceleration. This insufficient deceleration can be detected by the driver to provide a warning of excessively low braking effect.

A further increase in brake pressure with the effect of achieving the deceleration of the vehicle desired by the driver requires in any event an additional brake pedal travel which makes the driver aware of the excessively weak braking effect. This offers the possibility of a drivel intervention in the braking process by a further actuation of the brake pedal in order to achieve the desired deceleration without the brake pressure having to be automatically adjusted over an excessively large range.

The present invention results in a brake pressure adjustment which is symmetrical on both sides. The control algorithm is additionally simplified since it is only necessary to specify one limit value interval from the initial value for both deviation directions.

According to another aspect of the present invention, the detection of the exceptional case of emergency braking is permitted in which the limiting of the adjustment of the proportionality factor is eliminated so that the procedure of limited adjustment of the proportionality factor with the warning effect because of fading as a result of a negative gradient or a braking effect which decreases for another reason remains limited to the range of relatively small average brake pressures.

An embodiment of the present invention provides a particularly clear warning effect since, as a result of the returning of the proportionality factor from the limit value to the initial value at the start of a further actuation of the brake pedal, the braking effect does not initially change in this initial stage of the further actuation of the brake, or at any rate does not change to a degree proportional to the travel of the pedal, so that a genuine warning pedal travel is produced for the driver without increasing the deceleration of the vehicle.

As soon as the proportionality factor has reached the initial value, the further actuation of the brake pedal then leads again to a corresponding increase in the brake pressure until the desired deceleration of the vehicle is achieved.

In two embodiments of the present invention, the limit value interval of the proportionality factor of the initial value is prescribed as a function of the initial value itself or of the desired deceleration of the vehicle. This feature particularly takes into account fluctuations in the initial value which are to be expected depending on the driving speed, temperature and negative gradient and permits the realization of a clear warning travel even at the start of a journey and above all more reliably in the case of small desired decelerations than in the case of the selection of a constant limit value interval which is independent of these parameters.

In a configuration of the invention, a new evaluation, that is an adjustment, of the initial value for the proportionality factor for subsequent braking processes can be carried out from the value of the proportionality factor determined for the instantaneous braking, specifically dynamically, i.e. to a comparatively high degree and quickly, given an initially very high deviation of the actual deceleration from the desired deceleration of not less than +/−30%, and semi-dynamically, i.e. to a comparatively low degree and in small increments if a residual deviation of the actual deceleration from the desired deceleration by more than 3% above or below is detected. The subsequent braking process thus starts already with an improved initial brake pressure value, which generally reduces the duration of the necessary adjustment.

BRIEF DESCRIPTION OF THE DRAWINGS

These and other objects, features and advantages of the present invention will become more readily apparent from the following detailed description thereof when taken in conjunction with the accompanying drawings wherein.

DETAILED DESCRIPTION OF THE DRAWINGS

With the method described below with reference to the two-described drawing figures, the average brake pressure $(p_m)$ for a motor vehicle pressure medium-actuated power brake system, which can be activated by a brake pedal, is set in order to achieve a desired deceleration of the vehicle. A specific actuation of the brake pedal is evaluated by the driver as a request for a specific desired deceleration of the vehicle, and the brake pressure which is required to achieve this deceleration is reset by adjusting the proportionality factor between brake pressure and deceleration even in the case of a pedal position which is no longer changed.

Figure 1:
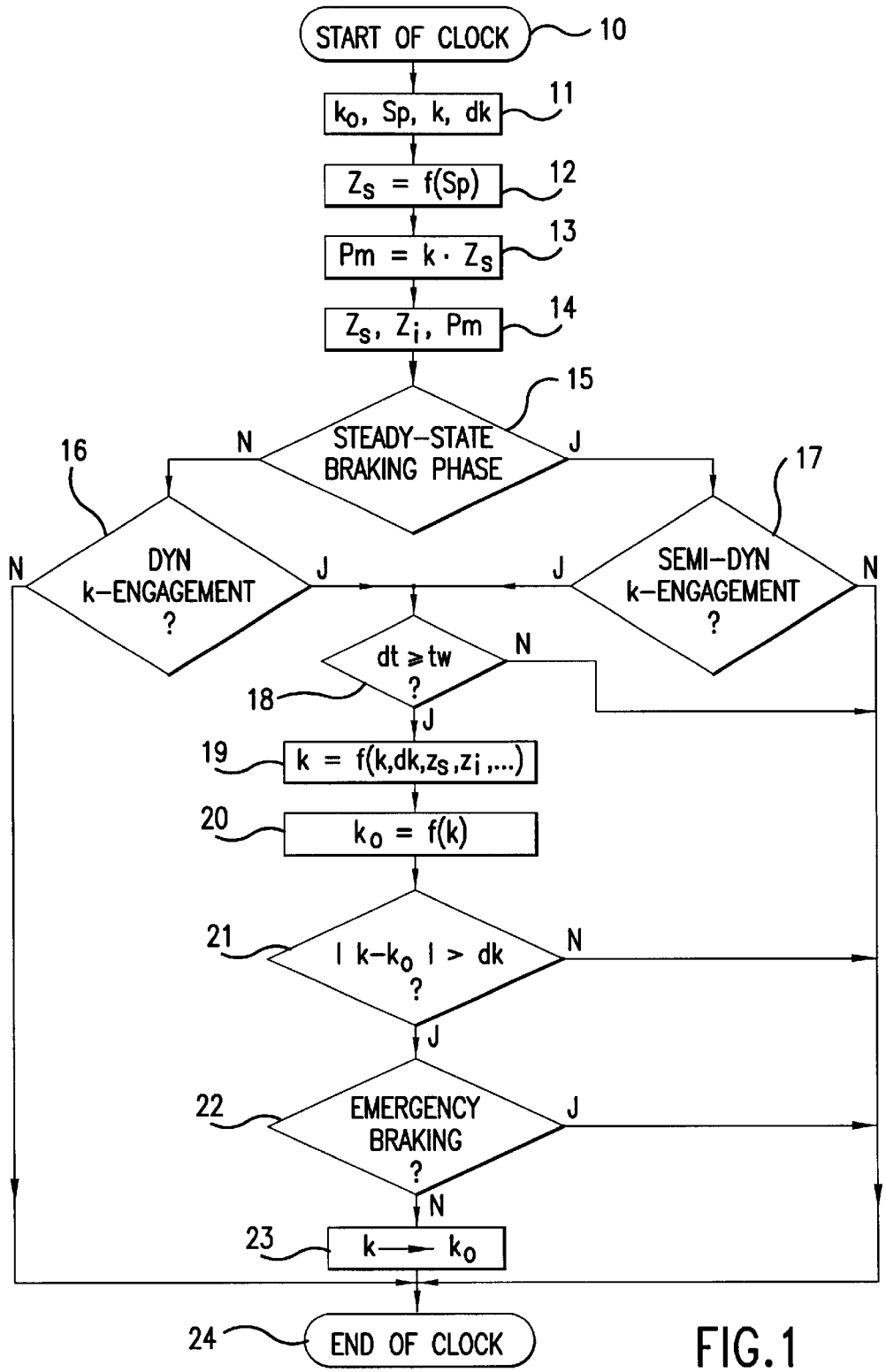
FIG. 1 is a flow diagram of a cycle for the adjustment of the proportionality factor between brake pressure and vehicle deceleration for setting a brake pressure required for a desired vehicle deceleration.

An adjustment cycle of the foregoing kind is shown in FIG. 1 and is explained below with reference to FIG. 2. It is to be noted at this point that the method can be realized for example while utilizing the units of a customary antilock brake system.

An adjustment cycle is triggered by a clock-start step 10 which is adjoined by a step 11 in which are input the necessary input parameters, such as the proportionality factor at the start of a braking process $(k_o)$, the instantaneous proportionality factor (k), the prescribed interval (dk) by way of which a lower value $(k_{min})$ for the limit value range and an upper value $(k_{max})$ for the limit value range, which values limit adjustment, are specified in accordance with the relations $k_{min}=k_o-dk$ and $k_{max}=k_o+dk$, and the brake pedal travel $(s_p)$ which is set by the driver in order to carry out the braking process.

Figure 2:
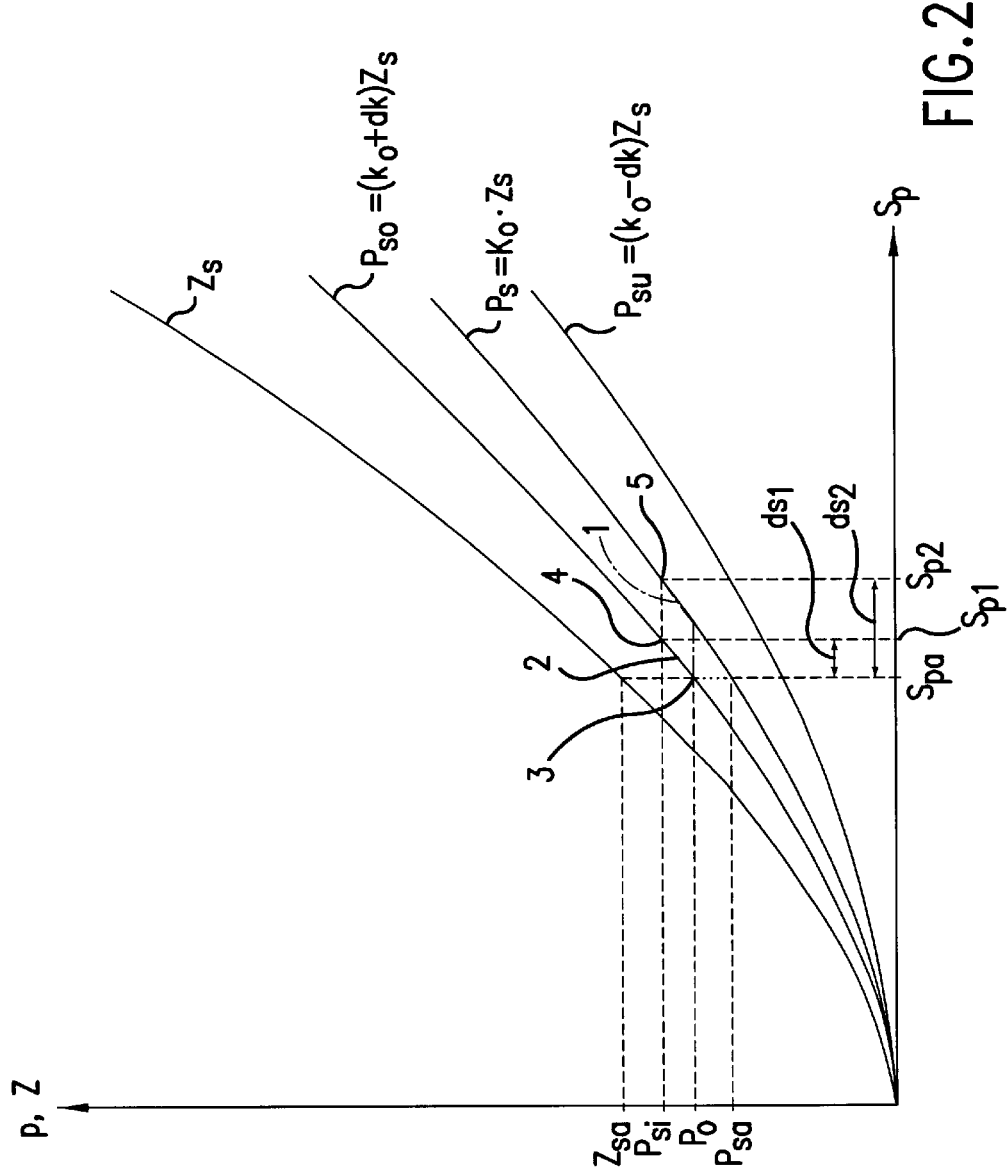
FIG. 2 is a diagram with different characteristic curves of the dependence of the vehicle deceleration and of the brake pressure on the brake pedal travel.

Using the last-mentioned input variable, the brake control determines the desired deceleration $(z_s)$ of the vehicle associated with the set travel $(s_p)$ of the brake pedal from the characteristic curve, prescribed for the brake control, for the functional dependence of the desired deceleration $(z_s)$ of the vehicle on the travel $(s_p)$ of the brake pedal, a typical variation of which deceleration $(z_s)$ is given by the top curve in FIG. 2. In subsequent step 13, the control determiner from the determined value of the desired vehicle deceleration $(z_s)$ and the instantaneous value of the proportionality factor (k) the average brake pressure $(p_m)$, to be set, of the brake system according to the relation $(p_m=k \cdot z_s)$. Of course, at the start of the braking process the proportionality factor (k) is set to the initial value $(k_o)$ and is modified if appropriate in the further course of the braking process, as is clear below.

In a next step 14 the instantaneous actual deceleration $(z_i)$ is detected by the brake control, and the value obtained is evaluated together with the determined values for the desired deceleration $(z_s)$ and the average brake pressure $(p_m)$ in a next step 15 in order to decide whether a so-called steady-state braking phase is present. Further details in this regard are described, for example, in DE 40 07 360 A1.

If a steady-state braking phase is not present in that step 15, it is subsequently interrogated in a decision step 16 whether the actual deceleration $(z_i)$ which occurs deviates from the desired deceleration $(z_s)$ by at least +/−30%. If not, the system jumps to the end 24 of the clock and a next cycle is carried out, otherwise a so-called dynamic k-intervention is performed. That is, in the case of such large deviations, dynamic intervention occurs as early as during a first braking operation at the start of a journey, and in subsequent steps the initial value $(k_o)$ is adapted more closely to the current vehicle load. If, in contrast, a steady-state braking phase is present in that step 15, an interrogation step 17 tests whether the deviation of the actual deceleration $(z_i)$ from the desired deceleration $(z_s)$ is greater than +/−3%. If this is the case, in subsequent steps the initial value $(k_o)$ is gradually adapted on the basis of these steady-state braking phases, e.g. during the first 5 to 20 braking operations or during the first 10 to 30 minutes of travel. If, in contrast, the deviation is not above the value of +/−3%, this small deviation is not evaluated as requiring adjustment of the proportionality factor and the system can jump to the end 24 of the clock.

If the execution. of a dynamic or a semi-dynamic k-intervention has been detected, the actual adjustment of the proportionality factor (k) and its initial value $(k_o)$ for a subsequent braking process takes place in the following steps. Initially, an interrogation step 18 tests whether. the time period (dt) since a preceding adaptation step has exceeded a prescribed waiting time (tw). If the prescribed waiting time has not been exceeded, the system jumps without k-adjustment to the end 24 of the clock so that adaptations which follow one another too quickly and thus would not be appropriate, taking into account the inertia of the brake system, are prevented. If, on the other hand, this waiting time (tw) has been exceeded, adjustment of the instantaneous value for the proportionality factor (k) takes place in an adaptation step 19 as a function of the previous value of the factor (k), of the actual deceleration and the desired deceleration and, if required, of further parameters taking into account the maximum permitted interval (dk) from the initial value $(k_o)$. In addition, an adaptation of the initial value $(k_o)$ for subsequent braking processes then takes place as a function of the newly determined proportionality factor (k) in the step 20. This possibly new initial value $(k_o)$ is stored and forms an optimum starting value for the following braking operations. Of course, the change in the initial value $(k_o)$ takes place with the effect of change in the instantaneous proportionality factor (k), but to a perceptively lower degree.

A subsequent interrogation step 21 tests whether the interval of the instantaneous proportionality factor (k) from the initial value $(k_o)$ for this braking process has exceeded the prescribed interval (dk). If not, the system jumps to the end 24 of the clock, after which in the next cycle a new, better average brake pressure value ($p_m$) with identical brake pedal position ($s_p$) on the basis of the changed, adjusted value for the proportionality factor (k) is set in order to achieve the desired deceleration of the vehicle. If, on the other hand, in this step 21 it is detected that the maximum interval (dk), and thus the adjustment range limited thereby, has been exceeded, a next interrogation step 22 initially tests whether it is a case of emergency braking. In order to detect such emergency braking, the desired deceleration ($z_s$), its chronological derivation ($dz_s/dt$) which reflects the speed of actuation of the pedal, and the instantaneous speed ($v_0$) of the vehicle are used as criteria, as is described, for example, in German Patent Application P 41 36 571.2. If emergency braking is not present, in a following step 23 the proportionality factor (k) of the exceeded range limit value is returned to the initial value ($k_o$), which constitutes the center of the range, in a manner described below with particular reference to FIG. 2. This returning of the proportionality factor (k) results in a particularly informative warning travel of the pedal for the driver. Subsequently, when the end 24 of the clock is reached, a cycle for adjusting the brake pressure during a braking process is terminated and a new cycle can be started. If, in contrast, the presence of emergency braking is detected in the interrogation step 22, returning of the proportionality factor (k) to the initial value does not take place, and the system jumps to the end 24 of the clock avoiding this return step 23. The end 24 of the clock finally also is reached when the return step 23 has been carried out in the case of normal braking.

The case of a range being exceeded during the adjustment of the proportionality factor and the subsequent measures are graphically illustrated in FIG. 2. It is initially assumed that the driver has set a value ($s_{pa}$) for the travel ($s_p$) of the brake pedal and, as a result, has requested a value ($z_{sa}$) for the desired deceleration in accordance with the characteristic curve $z_s$ ($s_p$). The proportionality factor (k) is located at its initial value ($k_o$) so that, accordingly, a value ($p_{sa}$) for the brake pressure is initially set which results from the brake pressure characteristic curve ($p_s=k_o z_s$) which is associated with the initial value ($k_o$) and from the prescribed pedal travel ($s_{pa}$). It is assumed that, with this brake pressure value ($p_{sa}$), the actual deceleration which is not shown remains below the actually desired value ($z_{sa}$). In accordance with the method sequence of FIG. 1, when the brake pedal position ($s_{pa}$) remains unchanged adjustment of the proportionality value (k) subsequently takes place with the effects of producing larger k-values in order to increase the actual brake pressure along the broken line in FIG. 2 until the adjusted proportionality factor (k) has reached the upper limit value ($k_{max}=k_o+dk$) of the range which corresponds to a brake pressure then prevailing of $p_o=(k_o+dk) z_{sa}$.

For the case shown in FIG. 2, it is also assumed that this upper brake pressure value ($p_o$) is not yet sufficient to achieve the desired deceleration value ($z_{sa}$) but rather that a value ($p_{si}$) of the actual brake pressure is therefore necessary as indicated in FIG. 2.

Starting from the control point 3 in FIG. 2, reached at the time of the range being exceeded during the adjustment of the proportionality factor (k), with the brake pedal position ($s_{pa}$), the achieved brake pressure ($p_o$) and an actual deceleration which still remains below the desired deceleration ($z_{sa}$), it is to be noted initially that no further k-increase, and thus no further increase in brake pressure, occurs at this control point 3 as a result of the limiting of the adjustment so that the driver detects that as a result of excessively low braking effect the desired deceleration ($z_{sa}$) is, contrary to expectations, not reached. This provides the driver with warning information which now permits him or her to effect the braking process by further driver actuation of the brake pedal, i.e. increasing the travel ($s_p$) of the brake pedal. The reaching of the required actual brake pressure ($p_{si}$) on the basis of this subsequent further actuation of the brake pedal is possible in different ways, two of which are explicitly shown in FIG. 2.

In an embodiment marked with the reference symbol 2, the maximum value ($k_{max}=k_o+dk$) which is present when the upper limit value is reached is retained 80 that, as a result of the further actuation of the brake pedal by the driver, the brake pressure changes along the associated upper limit curve ($p_{s0}=k_{max}z_s$). When a travel ($s_{p1}$) of the brake pedal which is greater than the originally set travel ($s_{pa}$) of the brake pedal by an additional travel ($ds_1$) is reached, the required brake pressure ($p_{si}$), and thus the desired declaration ($z_{sa}$), with this maximum k-value, is then reached at a control point 4. The additional value ($ds_1$) constitutes the warning travel which is produced in this variant and indicates the insufficient braking effect to the driver.

A second procedure which is realized successively by the step 23 in FIG. 1 is illustrated in FIG. 2 with the reference numeral 1 and the associated curve shown by dot-dash lines. In this procedure, starting from the control point 3 when the range of the proportionality factor 3 being exceeded is detected in a first section of a further actuation of the brake pedal, i.e. the increase in the travel ($s_p$) of the brake pedal, the proportionality factor (k) is returned by the driver to the average value of the range, i.e. the initial value ($k_o$) specifically synchronously with the increase in the travel of the brake pedal, to such an extent that in this phase the brake pressure ($p_o$) of the control point 3 is kept constant. If the proportionality factor (k) has reached its initial value ($k_o$) again, as is provided according to the step 23 in FIG. 1, in a second section the proportionality factor (k) is kept constant at this initial value ($k_o$) so that the brake pressure is increased along the associated characteristic curve ($p_s=k_o z_s$) when the travel ($s_p$) of the brake pedal increases until it has reached the required brake pressure value ($p_{si}$) at the brake pedal position ($s_{p2}$). In this embodiment, the additional braking travel, i.e. the warning travel ($ds_2$), is significantly larger than in the above-described first embodiment which leads to a particularly clear warning effect. Of course, any other modification in the k-value can also be carried out during a change in the brake pedal in the step 23 in FIG. 1. A completely analogous procedure can take place for the case when the k-value drops below the k-range when the brake pressure to be set is below the lower brake pressure characteristic curve $p_{su}=(k_o-dk) z_s$ which is associated with the lower limit value $k_{min}=k_o-dk$ of the range.

It is possible to specify in different ways the interval value (dk) which specifies the limit value of the range, e.g. as a constant value. However, it is more favorable than the latter if this value (dk) is selected to be a percentage of the proportionality factor (k), e.g. to lie between 0.1·k and 0.3·k, or to rise linearly with the desired deceleration ($z_s$). This dependence upon the proportionality factor takes into account fluctuations in the proportionality factor which are to be expected due to the speed of the vehicle, the temperature and the respective positive gradient of the roadway. The warning effect should be clear but consequently also remain limited to more critical cases, for which reason the brake pressure corridor which is produced by the range interval (dk) should not be made too narrow.

Furthermore, the selection of the suitable corridor width is dependent on the accuracy of a detection of a possible positive gradient or negative gradient and on the remaining fluctuation of the characteristic values according to a standardization to a reference speed, as indicated in the above-referenced German Patent Application P 41 36 571.2. The definition of the permitted interval (dk) as a percentage of the proportionality factor (k) itself ensures that with an obviously excessively weak braking effect, e.g. with a value (k) which is greater than 20 bar/g where g is the value of the acceleration due to gravity, a clear warning travel is already provided even at the start of a journey and, above all, even with a low desired deceleration ($z_s$) of the vehicle. The warning because of fading due to a negative gradient or because of any decreasing braking effect can as a rule be limited to small average brake pressures ($p_m$) In the case of emergency braking a rapid increase in the average brake pressure ($p_m$) is ensured.

Of course, the method according to the present invention can be used in a multiplicity of different kinds of known brake control systems, to which end the input parameters for the brake control are to be suitably selected for each such system.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A method for electronically influenceable brake pressure control for a motor vehicle pressure medium-actuated power brake system actuatable via a brake pedal comprising the steps of assigning a specific desired vehicle deceleration within a braking process to each travel of the brake pedal, and selectively setting the required brake pressure automatically by incremental adjustment from an initial value of an intentionally set variable proportionality factor defined by deceleration and brake pressure to constitute a positive real number between a preset lower limit value and a preset upper limit value sized to the brake pressure achievable with the brake system and containing the initial value, wherein a vehicle driver is provided with suitable indication of a braking effect of the vehicle.

2. The method according to claim 1, wherein an interval of equal magnitude from the initial value is provided for the lower limit value and for the upper limit value.

3. The method according to claim 1, wherein the desired vehicle deceleration, a time derivate of the deceleration and actual vehicle speed are determined and evaluated to indicate whether emergency braking is present and the incremental adjustment of the proportionality factor is only limited when emergency braking is not present.

4. The method according to claim 3, wherein an interval of equal magnitude from the initial value is provided for the lower limit value and for the upper limit value.

5. The method according to claim 1, wherein when the upper limit value is reached at the end of an adjustment process of the proportionality factor during a subsequent further brake pedal actuation in order to achieve the desired vehicle deceleration, the proportionality factor is initially returned incrementally from the upper limit value to the initial value and subsequently kept constant.

6. The method according to claim 5, wherein an interval of equal magnitude from the initial value is provided for the lower limit value and for the upper limit value.

7. The method according to claim 6, wherein the desired vehicle deceleration, a time derivate of the deceleration and actual vehicle speed are determined and evaluated to indicate whether emergency braking is present and the incremental adjustment of the proportionality factor is only limited when emergency braking is not present.

8. The method according to claim 2, wherein the interval is a function of one of the initial value, and of the desired vehicle deceleration.

9. The method according to claim 8, wherein the interval is between $0.1 \cdot k_o$ and $0.3 \cdot k_o$.

10. The method according to claim 8, wherein the interval increases linearly with the desired vehicle deceleration.

11. The method according to claim 1, wherein given a deviation of actual deceleration from the desired deceleration of not less than +/−30%, the initial value for a subsequent braking process is adjusted to a greater extent, and given a deviation of the actual deceleration from the desired deceleration of less than +/−30% but more than +/−3%, the initial value is adjusted to a lesser extent, as a function of an adjustment value of the proportionality factor of the instantaneous braking process.

12. The method according to claim 11, wherein an interval of equal magnitude from the initial value is provided for the lower limit value and for the upper limit value.

13. The method according to claim 12, wherein the desired vehicle deceleration, a time derivate of the deceleration and actual vehicle speed are determined and evaluated to indicate whether emergency braking is present and the incremental adjustment of the proportionality factor is only limited when emergency braking is not present.

14. The method according to claim 13, wherein when the upper limit value is reached at the end of an adjustment process of the proportionality factor during a subsequent further brake pedal actuation in order to achieve the desired vehicle deceleration, the proportionality factor is initially returned incrementally from the upper limit value to the initial value and subsequently kept constant.

15. The method according to claim 14, wherein the interval is a function of one of the initial value, and of the desired vehicle deceleration.

16. The method according to claim 1, wherein the present lower limit value $k_{min}$ is $k_o$−dk, and the present upper limit value $k_{max}$ is $k_o$+dk, where $k_o$ is the initial value and dk is a prescribed interval.

\* \* \* \* \*